United States Patent [19]
Satzler

[11] Patent Number: 5,863,104
[45] Date of Patent: Jan. 26, 1999

[54] BELT EDGE SCRAPER

[75] Inventor: Ronald L. Satzler, Princeville, Ill.

[73] Assignee: Caterpillar Inc., Peoria, Ill.

[21] Appl. No.: 931,609

[22] Filed: Sep. 16, 1997

[51] Int. Cl.[6] ............................................... B62D 55/088
[52] U.S. Cl. ........................................ 305/110; 305/107
[58] Field of Search ................................ 305/100, 107,
305/109, 110; 111/200; 172/610, 558, 561,
566; 404/129

[56] References Cited

U.S. PATENT DOCUMENTS

| | | | |
|---|---|---|---|
| 2,077,919 | 4/1937 | Engstrom | 305/110 X |
| 2,560,307 | 7/1951 | Slemmons | 305/110 |
| 4,198,103 | 4/1980 | Ward et al. | 305/110 X |
| 4,278,391 | 7/1981 | Dagenais | 305/110 X |
| 5,725,292 | 3/1998 | Keedy et al. | 305/107 X |

FOREIGN PATENT DOCUMENTS 1472332  4/1989  U.S.S.R. ................................ 305/100

Primary Examiner—Russell D. Stormer
Attorney, Agent, or Firm—Joseph W. Keen; Steven G. Kibby; Kevin M. Kercher

[57] ABSTRACT

An edge scraper device for the inboard edge of a belted track-type vehicle removes debris from the track edge as the vehicle operates in muddy or trash-laden environments by close-proximity relationship to the track edge. Spring biasing and adjustment devices retain the scraper device in a functionally close proximity to the track edge. The edge scraper device is mounted substantially above the track to prevent fallen debris from accumulating on the device.

13 Claims, 6 Drawing Sheets

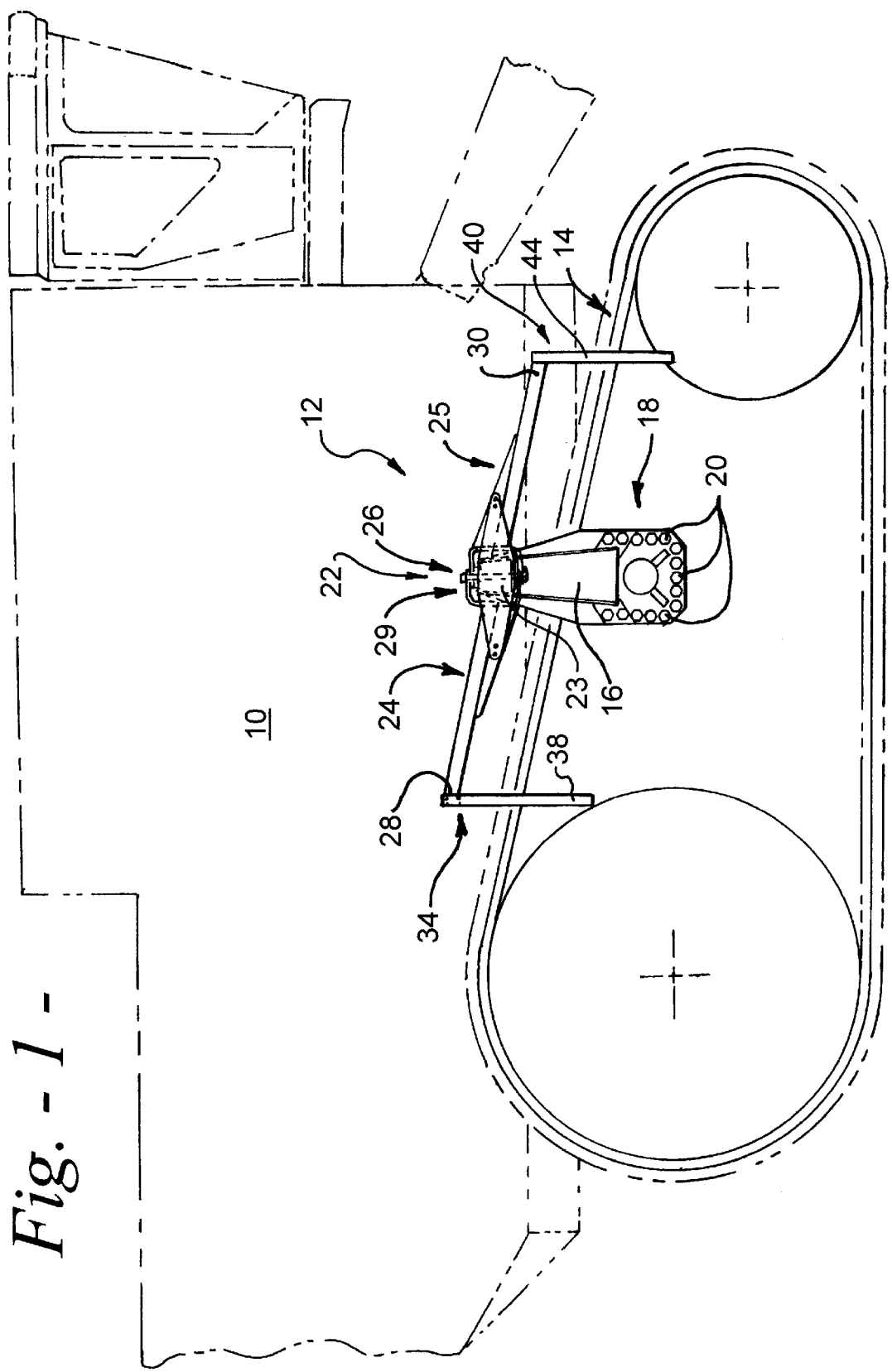
Fig. -1-

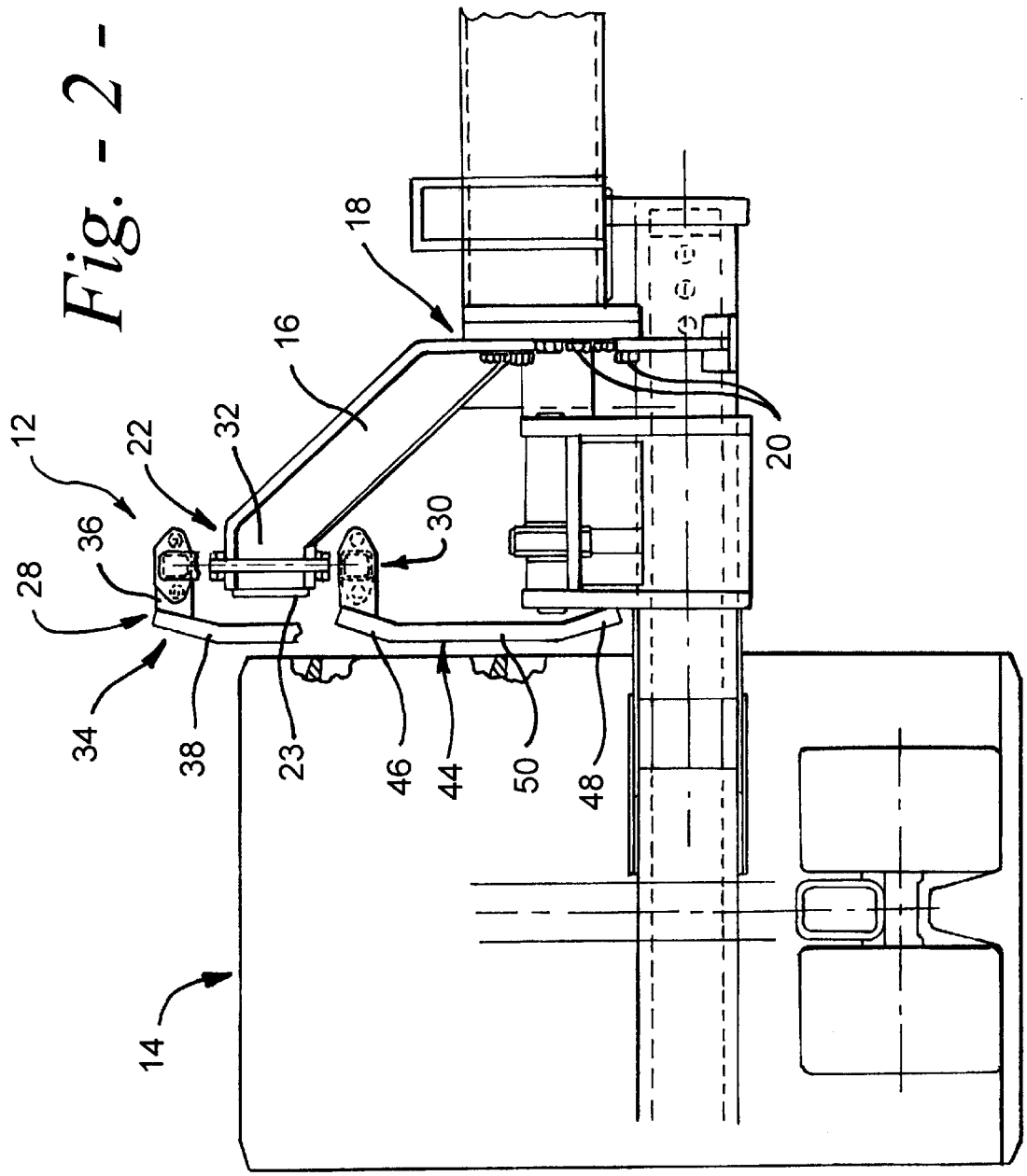

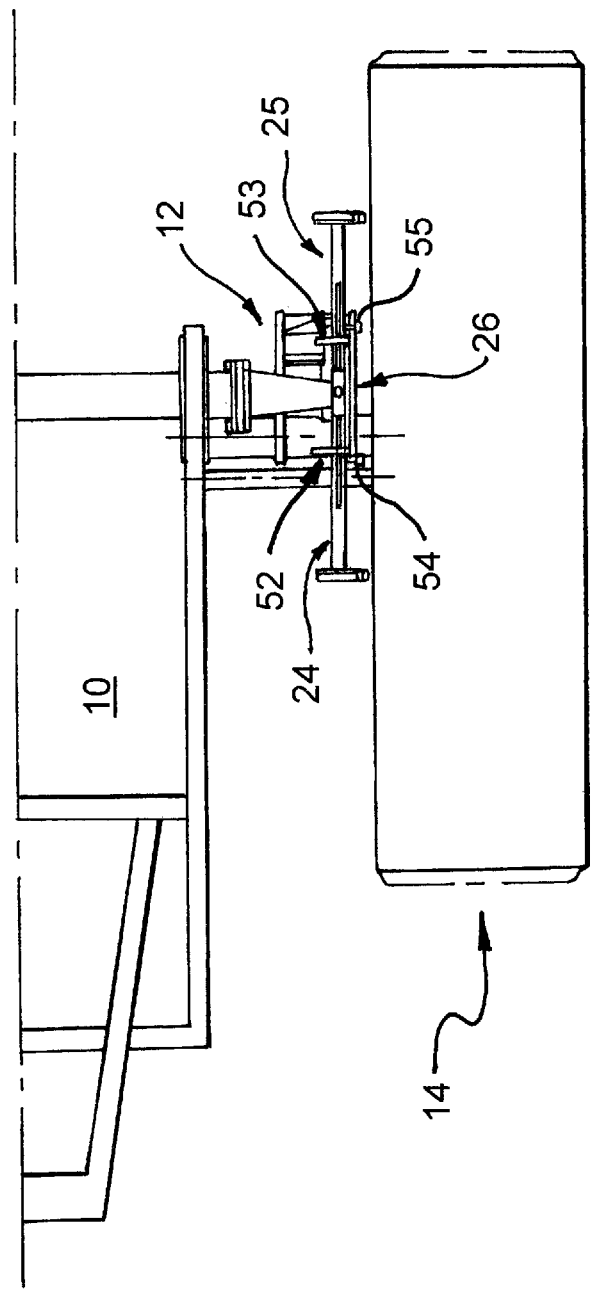
Fig. - 3 -

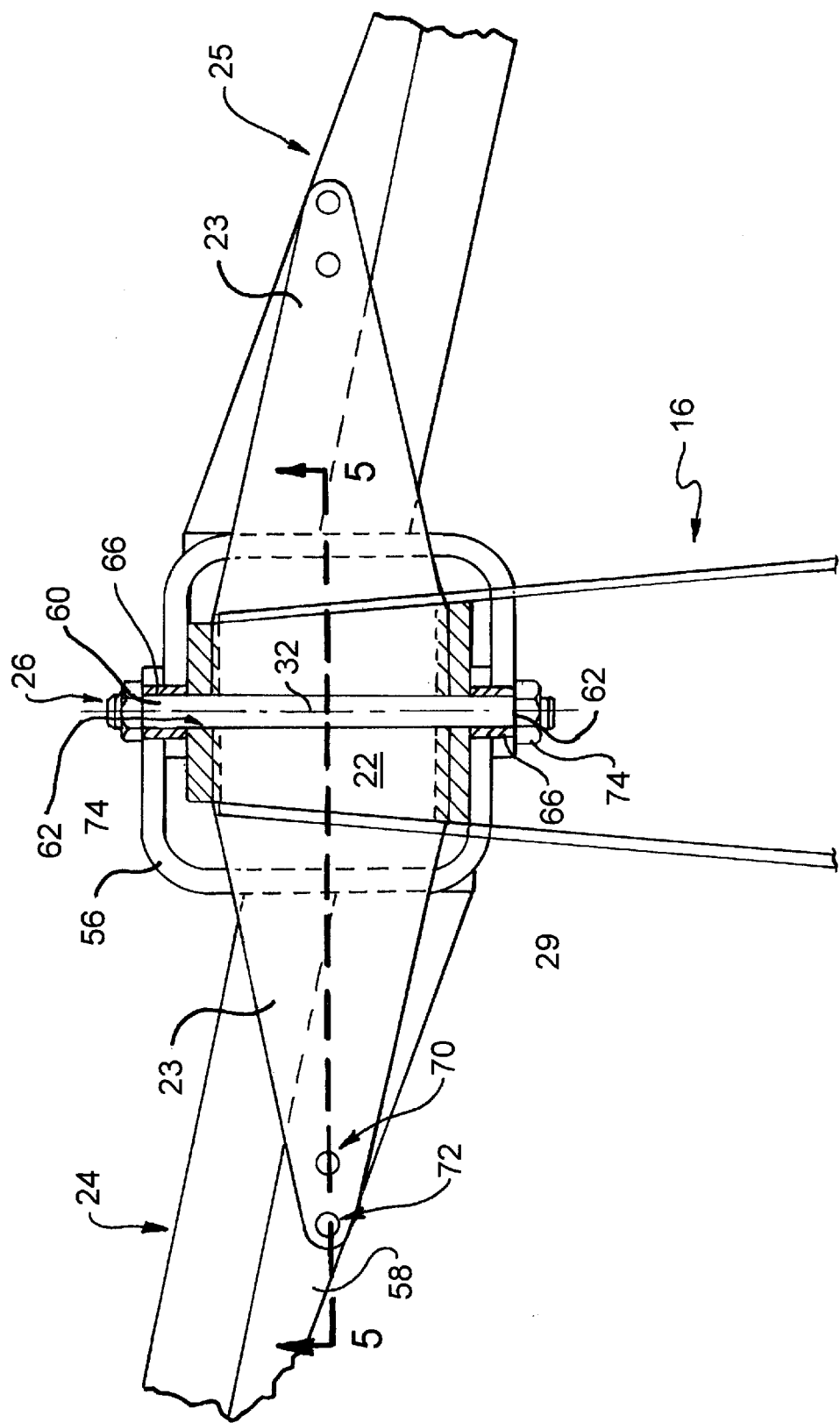

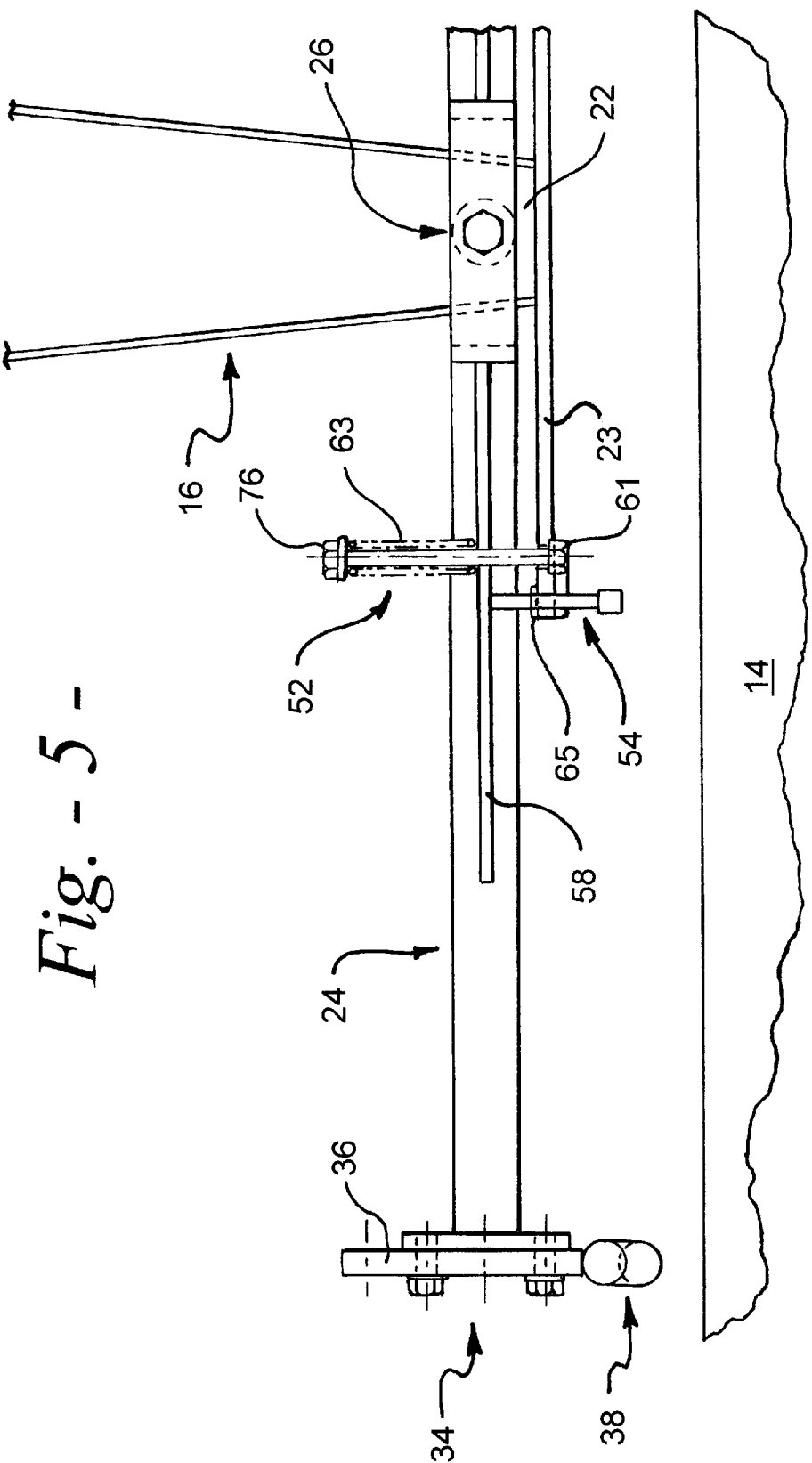
Fig. - 5 -

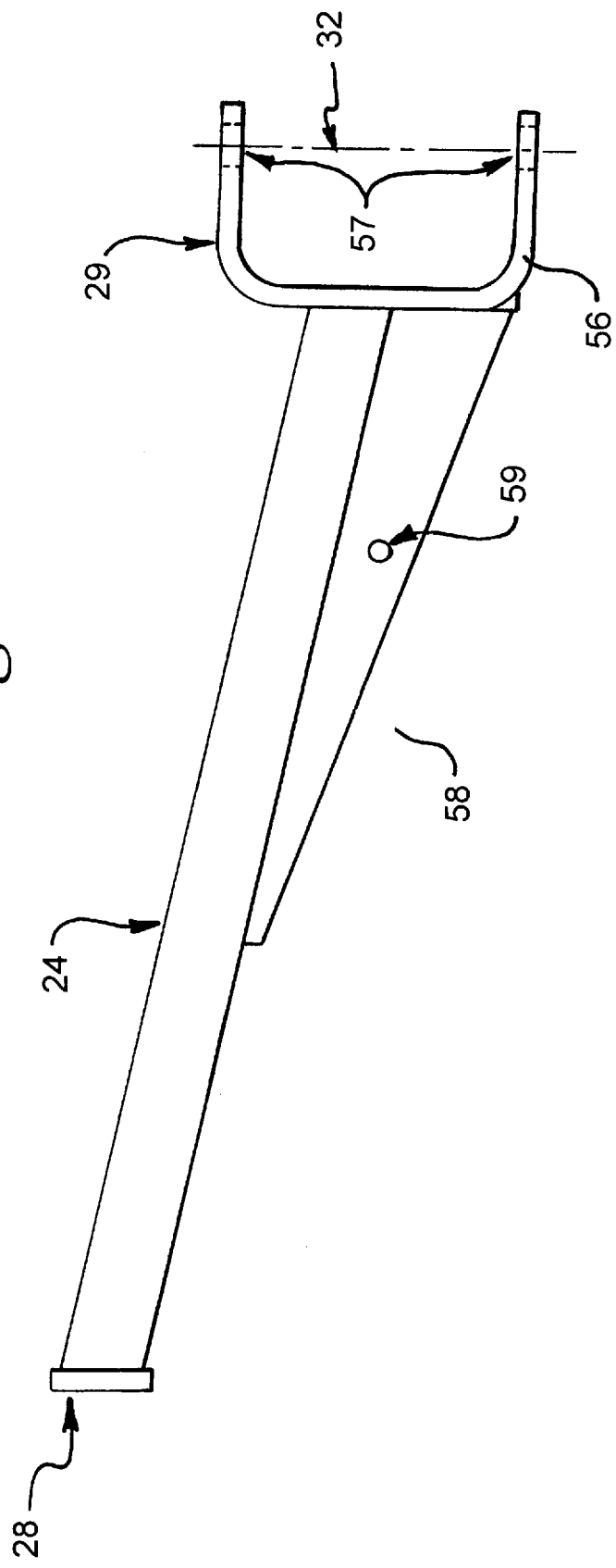

BELT EDGE SCRAPER

TECHNICAL FIELD

This invention relates generally to track-type work machines and in particular to devices for clearing debris from the edge of a belted track on a track-type work machine.

BACKGROUND ART

On track-type work machines such as belted agricultural tractors and combines, debris such as mud, trash and crop residue often accumulate on the outside of the track belts and fall onto the frame structure supporting the track assembly. Debris build-up causes problems with the track assembly such as belt misalignment, slippage and improper tensioning. Round bar scrapers have been found to be somewhat effective in removing the debris before it gets above the frame structure. However, the bar scrapers must be supported and the more convenient way to support the scraper is to support it at its bottom end. With the scraper supported in this manner, the debris falls onto the scraper support and there builds up.

The present invention is directed to overcoming one or more of the problems set forth above.

DISCLOSURE OF THE INVENTION

In one aspect of the present invention, an edge scraper device for the inboard edge of the track of a track-type work machine includes a mounting frame having a frame end and a pivot end, the frame end being attached to the work machine and the pivot end having a face portion and a pivot assembly. A mounting arm extends longitudinally and substantially in parallel with the track, and has distal and proximal ends, the proximal end being attached to the pivot assembly.

The edge scraper device includes a first scraper assembly having a connecting portion and a scraper arm, the scraper arm being in close proximity to the inboard edge of the track for contacting and removing debris from the track and is substantially perpendicular to the first mounting arm. The connecting portion joins the scraper arm to the first mounting arm at the distal end of the mounting arm. The scraper assembly is pivotally movable inwardly about the pivot assembly in response to a force on the scraper assembly.

BRIEF DESCRIPTION OF THE DRAWINGS

FIG. 1 is a diagrammatic right side view of a belted track combine with the subject invention installed.

FIG. 2 is a diagrammatic partial front view of the right side of the combine seen in FIG. 1.

FIG. 3 is a diagrammatic partial top view of the right side of the combine seen in FIG. 1.

FIG. 4 is an enlarged view of the center portion of the subject invention seen FIG. 1.

FIG. 5 is an enlarged view of the rearward portion of the subject invention seen in FIG. 3.

FIG. 6 is a diagrammatic front view of an unattached mounting arm seen without a scraper arm assembly.

BEST MODE FOR CARRYING OUT THE INVENTION

Referring to the drawings, a track-type work machine such as a belted-track combine 10 is seen with an edge scraper device 12 installed at the inboard side of the right track 14. While not shown, it is to be understood that the edge scraper device may also be installed at the left track.

As best seen in FIGS. 1, 2 and 4, scraper device 12 includes a mounting frame 16 which is securely attached at frame end 18 to the combine 10 by a plurality of mounting bolts 20. Optionally, the frame end 18 may be attached to the work machine 10 by other suitable methods, such as welding or chemical bonding (not shown). At the opposite end of the frame end 18 is pivot end 22, which end has a substantially flat face portion 23 that is advantageously made of metal plate. The face portion 23 is normal to the plane of travel of track 14 and extends parallel to the direction of travel of track 14. As best seen in FIG. 4, pivot end 22 has pivot assembly 26, which assembly includes pivot bolt 60, pivot bolt holes 62,62 and axis 32. The axis 32 is defined by pivot bolt holes 62,62 and is substantially normal to the plane of travel of track 14. Pivot assembly 26 advantageously rotates about axis 32.

As seen in FIGS. 1 and 4–6, first mounting arm 24 extends longitudinally and substantially in parallel with the track 14 and has distal end 28 and proximal end 29. At proximal end 29 is C-shaped bracket 56 having pivot holes 57,57 at its upper and lower ends. Longitudinal axis 32 is defined through pivot holes 57,57, which holes align with pivot bolt holes 62,62. Pivot bolt 60 passes through pivot holes 57,57 and pivot bolt holes 62,62 and is secured on each bolt end by fasteners 74,74. Bushings 66,66 are advantageously inserted in pivot holes 57,57. First mounting arm 24 rotates about axis 32 of pivot assembly 26. Second mounting arm 25 rotates about axis 32 of pivot assembly 26 in a similar, but linearly opposed manner.

Mounting arm 24 includes first web portion 58 having second spring bolt hole 59 between proximal and distal ends 29,28. A corresponding first spring bolt hole 70 is on face portion 23 of mounting frame 16. Spring bolt 61 passes through first spring bolt hole 70, second spring bolt hole 59 and the inner coils of coil spring 63. Spring 63 presses against the inboard side of web 58 and is retained on spring bolt 61 by retaining member 76. In operation, spring 63 is compressed as first mounting arm 24 rotates away from right track 14. On face portion 23 is adjustment screw hole 72 for receiving first adjustment screw 54. First adjustment nut 65 engages first adjustment screw 72 on the inboard side of face portion 23. First adjustment screw 54 passes through adjustment screw hole 72 and contacts web portion 58, with the portion of screw 54 between the outboard side of web 58 and the inboard side of face portion 23 controlling the relative lateral position of first scraper assembly 34 to track 14. First mounting arm 24 is advantageously located substantially above track 14 to prevent removed debris from accumulating on the mounting arm.

Referring particularly to FIGS. 1, 2 and 5, at first end 28 of first mounting arm 24 is first scraper assembly 34, which assembly includes connecting portion 36 and scraper arm 38. The connecting portion 36 joins the scraper arm 38 to distal end 28 of first mounting arm 24. Scraper arm 38, which is advantageously a round bar, is positioned in close proximity to the inboard edge of track 14 for contacting and removing debris from the track, with its lateral proximity adjusted by first adjustment screw 54. Scraper arm 38 is substantially perpendicular to first mounting arm 24 with its length extending from above track 14 down to and below the inboard edge of track 14. Second scraper assembly 40 is constructed and operates in substantially the same manner as first scraper assembly 34, but is located on distal end 30 of second mounting arm 25. As shown in FIG. 2, scraper arm 44 of second scraper assembly 40 is advantageously shaped with a center portion 50 positioned closest to the edge of track 14 and with upper and lower ends 46,48 tapering away from the center portion 50. The shape of scraper arm 44 may be duplicated on scraper arm 38.

INDUSTRIAL APPLICABILITY

In operation, the scraper arms 38,44 of scraper device 12 are positioned in close proximity to the edge of track belt 14 by first and second adjustment screws 54,55. Debris, such as mud and crop harvest residue, which accumulate on a track belt and spread to the inboard edge of the belt is knocked off as the debris-laden belt rotates past scraper arms 38,44. Scraper arm 38 is the primary scraper for forward belt rotation and scraper arm 44 is primary for reverse belt rotation. With the mounting arms 24,25 substantially above the belt, the debris falls away from the arms and does not accumulate on the arms.

The edge of belt 14 often moves laterally in operation and each scraper assembly 34,40 can pivot inwardly if necessary to accommodate lateral belt movement. Each scraper assembly 34,40 pivots inwardly about pivot assembly 26 in response to forces thereon such as provided by inwardly lateral movements of the belt while first and second spring assemblies 52,53 return the scraper assemblies to preset lateral positions relative to the belt 14.

It is to be noted that the location of the scraper assembly 34,40 and pivot end 22 above the track significantly aids in the operation of the edge scraper device and the pivoting action of the pivot assembly or scraper assembly is not required for the non-accumulating functionality described earlier.

Other aspects, objects and advantages of this invention can be obtained from a study of the drawings, the disclosure, and the appended claims.

I claim:

1. An edge scraper device for a track of a track-type work machine, the track having an inboard edge toward the center of the work machine, comprising:

a mounting frame having a frame end and a pivot end, the frame end being attached to the work machine and the pivot end having a pivot assembly;

a first mounting arm extending longitudinally with the track, the first mounting arm having a distal end and a proximal end, the proximal end attaching to the pivot assembly; and a first scraper assembly having a connecting portion and a scraper arm, the scraper arm being in close proximity to the inboard edge of the track for contacting and removing debris from the track edge and being substantially perpendicular to the first mounting arm, the connecting portion joining the scraper arm to the first mounting arm at the distal end, wherein the mounting arm is pivotally movable about the pivot assembly in response to a force on the scraper assembly.

2. The scraper device as set forth in claim 1 further comprising a second mounting arm extending longitudinally with the track, the second mounting arm having a distal end and a proximal end, the proximal end attaching to the pivot assembly; and a second scraper assembly having a connecting portion and a scraper arm, the scraper arm being in close proximity to the inboard edge of the track for contacting and removing debris from the track and being substantially perpendicular to the second mounting arm, the connecting portion joining the scraper arm to the second mounting arm at the distal end.

3. The scraper device of claim 1 wherein the pivot end has a face portion and further comprising spring means flexibly connecting the first mounting arm and the face portion, the spring means being between the distal and proximal ends of the first mounting arm and resiliently mounting the scraper assembly relative to the mounting frame.

4. The scraper device of claim 2 wherein the pivot end has a face portion and further comprising spring means flexibly connecting the second mounting arm and the face portion, the spring means being between the distal and proximal ends of the second mounting arm.

5. The scraper device of claim 1 further comprising adjustment means for positioning the first scraper assembly with respect to the inboard edge of the track, the adjustment means being between the distal and proximal ends of the first mounting arm.

6. The scraper device of claim 2 further comprising adjustment means for positioning the second scraper assembly with respect to the inboard edge of the track, the adjustment means being between the distal and proximal ends of the second mounting arm.

7. The scraper device of claim 1 wherein the first mounting arm is substantially above the track.

8. The scraper device of claim 2 wherein the second mounting arm is substantially above the track.

9. The scraper device of claim 1 wherein the scraper arm has end portions and a center portion and the end portions taper away from the center portion.

10. The scraper device of claim 2 wherein each scraper arm has end portions and a center portion and the end portions taper away from the center portion.

11. The scraper device of claim 1 wherein the pivot assembly has an axis of rotation substantially normal to the plane of travel of the track.

12. The scraper device of claim 1 wherein the pivot assembly is non-rotating.

13. The scraper device of claim 1 wherein the scraper arm assembly is non-rotating.

* * * * *